(12) United States Patent
Rozman et al.

(10) Patent No.: US 8,729,838 B2
(45) Date of Patent: May 20, 2014

(54) CURRENT CONTROL FOR AN ELECTRIC ACTUATOR

(75) Inventors: Gregory I. Rozman, Rockford, IL (US); Matthew L. Wilhide, Cherry Valley, IL (US); Jacek F. Gieras, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 57 days.

(21) Appl. No.: 13/475,209

(22) Filed: May 18, 2012

(65) Prior Publication Data

US 2013/0307447 A1 Nov. 21, 2013

(51) Int. Cl.
*H02P 6/00* (2006.01)

(52) U.S. Cl.
USPC .............. 318/400.01; 318/400.02; 318/722; 318/811; 363/44

(58) Field of Classification Search
USPC ........... 318/400.01, 400.02, 722, 811; 363/44
See application file for complete search history.

(56) References Cited

U.S. PATENT DOCUMENTS

| | | | |
|---|---|---|---|
| 5,233,512 A | 8/1993 | Gutz et al. | |
| 6,249,100 B1 | 6/2001 | Lange | |
| 7,034,493 B2 * | 4/2006 | Yoshimoto et al. | 318/629 |
| 7,282,886 B1 * | 10/2007 | Patel et al. | 318/721 |
| 8,093,856 B2 * | 1/2012 | Miyaji | 318/632 |
| 2007/0070660 A1 * | 3/2007 | Tallam | 363/44 |
| 2008/0116835 A1 * | 5/2008 | Tsui et al. | 318/615 |
| 2009/0033258 A1 * | 2/2009 | Atarashi | 318/400.3 |

* cited by examiner

*Primary Examiner* — Eduardo Colon Santana
*Assistant Examiner* — Bickey Dhakal
(74) *Attorney, Agent, or Firm* — Kinney & Lange, P.A.

(57) ABSTRACT

A controller for an electric actuator includes a reference model that generates position and speed reference signals in response to a position command signal and employs a feed forward model that accounts for dynamic loading of the electric actuator. The feed forward model receives the position and speed reference signals provided by the reference model, and in response generates feed forward signals that account for mechanical characteristics of the electric actuator.

15 Claims, 6 Drawing Sheets

CURRENT CONTROL FOR AN ELECTRIC ACTUATOR

BACKGROUND

The present invention is related to electric actuators, and in particular to a controller for electric actuators.

Actuators are employed in a variety of applications to automate the opening and closing of valves. Electric actuators rely on a motor that converts electric energy to mechanical energy to open/close the actuator. For example, permanent magnet motors are oftentimes employed in linear and rotary actuators in applications such as fuel valve actuators. A controller receives an input representing a desired position of the actuator, and generates control signals to regulate the operation of the motor and therefore achieve the desired result.

For example, in one prior art method the controller may make use of a position loop, a speed loop, and a torque loop to control the operation of the electric actuator. The position loop monitors the difference between the desired position and the monitored position, and generates in response a speed command that is provided to the speed loop. In response, the speed loop generates a torque command that is provided to the torque loop that generates command instructions used to control the operation of the electric actuator. However, these control systems do not account for large load parameter variations such as those created by mechanical aspects of the electric actuator, such as those caused by spring-assist closing of the valve associated with the electric actuator.

SUMMARY

A controller for an electric actuator includes an abc-to-dq transformation block, a reference model block, a position speed control block, a feed forward block, a synchronous current regulator block, a dq-to-abc transformation block, and a pulse width modulation (PWM) control block. The controller receives a plurality of inputs representing monitored currents supplied to the electric actuator, a position feedback signal that represents a monitored position of the electric actuator, and a speed feedback signal that represents a monitored speed of the electric actuator. The abc-to-dq transformation block converts the monitored current from an abc stationary reference frame to a dq rotating reference frame to generate q-axis and d-axis current feedback signals. The reference model receives a position command signal that dictates the desired position of the electric actuator and generates in response a position reference signal and a speed reference signal. The position speed control block compares the position reference signal to the position feedback signal and the speed reference signal to the speed feedback signal to generate a q-axis current reference signal. The feed forward block generates a q-axis current feed forward signal based on the speed reference signal and the position reference signal provided by the reference model. The synchronous current regulator compares q-axis current feedback signal to the q-axis reference signal provided by the position speed control block to generate a q-axis current error signal that is modified by the q-axis current feed forward signal. The synchronous current regulator also compares the d-axis current feedback signal to the d-axis reference signal to generate a d-axis current error signal. The synchronous current regulator generates a q-axis voltage reference signal based on the modified q-axis current error signal, and a d-axis voltage reference based on the d-axis current error signal. The dq-to-abc transformation block converts the q-axis voltage reference signal and the d-axis voltage reference signal from the dq reference frame to voltage reference signals in the abc reference frame. The pulse width modulation (PWM) control block generates PWM signals based on the voltage reference signals provided by the dq-to-abc transformation block for provision to an inverter that supplies current to the electric actuator.

In another embodiment, a current regulator employs adaptive gain blocks to prevent oscillations in the electric motor when being held in a particular position. The current regulator includes a plurality of inputs, a q-axis current regulator loop, a d-axis current regulator loop, a conditions monitoring block, a q-axis adaptive gain block, and a d-axis adaptive gain block. The plurality of inputs includes inputs for receiving q-axis and d-axis reference current signals and q-axis and d-axis feedback current signals. The q-axis current regulator loop compares the q-axis reference current signal to the q-axis feedback current signal to generate a q-axis error signal, and employs a proportional-integral controller to generate a q-axis voltage command signal in response to the q-axis error signal. The d-axis current regulator loop compares the d-axis reference current signal to the d-axis feedback current signal to generate a d-axis error signal, and employs a proportional-integral controller to generate a d-axis voltage command signal in response to the q-axis error signal. The conditions monitoring block generates an enable signal when the electric motor is maintained in a particular position and generates a reset signal when the electric motor is not being maintained in a particular position. The q-axis adaptive gain block is activated in response to the enable signal to generate a q-axis adaptive gain value based on detected oscillations within the q-axis feedback signal, wherein the q-axis adaptive gain value is combined with the q-axis error signal that is provided to the PI controller to generate the q-axis voltage command signal. The d-axis adaptive gain block is activated in response to the enable signal to generate a d-axis adaptive gain value based on detected oscillations within the d-axis feedback signal, wherein the d-axis adaptive gain value is combined with the d-axis error signal that is provided to the PI controller to generate the d-axis voltage command signal.

DETAILED DESCRIPTION

Figure 1:
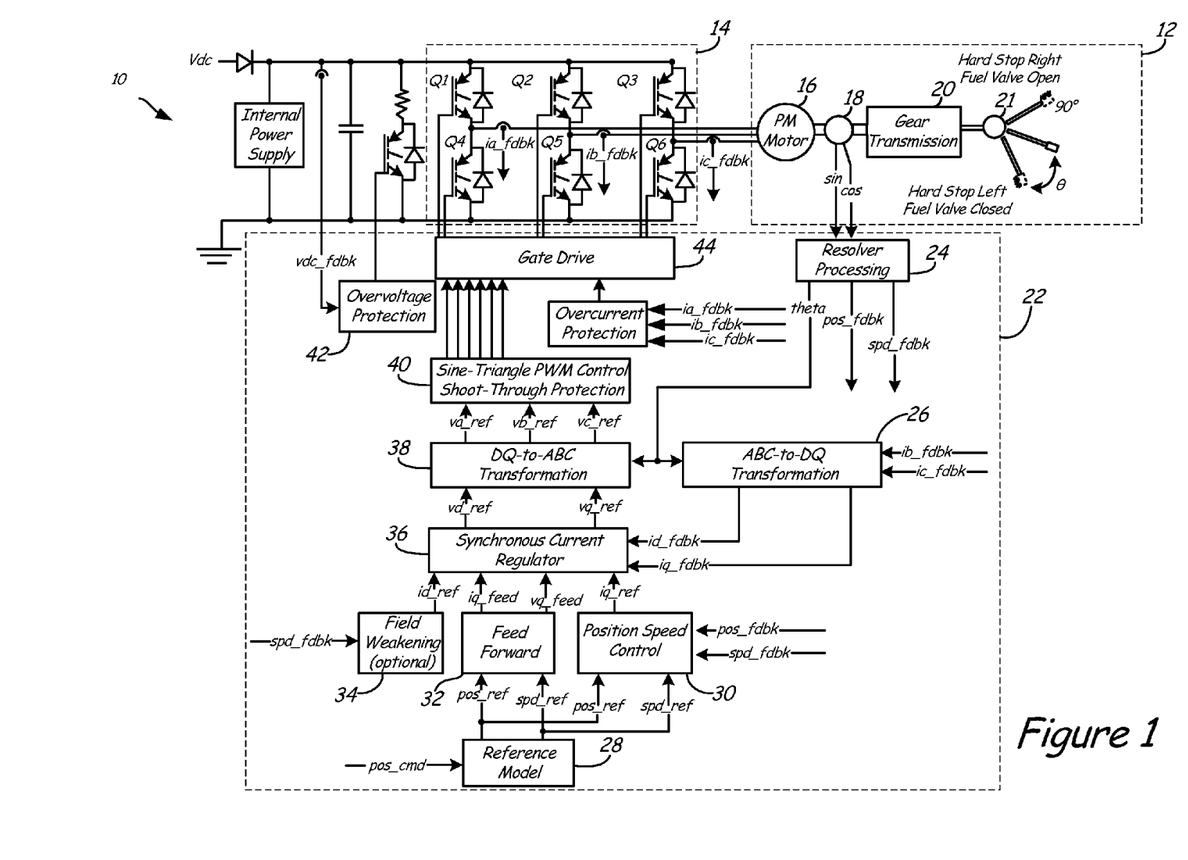
FIG. 1 is a block diagram of a control system for an actuator according to an embodiment of the present invention.

FIG. 1 is a block diagram of control system 10 for an electric actuator 12 according to an embodiment of the present invention. Control system 10 includes inverter 14, permanent magnet motor 16, resolver 18, gear transmission 20, valve 21, and controller 22. In the embodiment shown in FIG. 1, controller 22 includes resolver processing block 24, ABC-to-dq transformation block 26, reference model 28, position speed control block 30, feed forward block 32, field-weakening block 34, synchronous current regulator 36, dq-to-ABC transformation block 38, sine-triangle PWM controller block 40, overcurrent protection block 42, and gate drive block 44.

Inverter 14 converts a direct-current (DC) voltage to an alternating current (AC) voltage for supply to PM motor 16. Inverter 14 includes a plurality of solid-state switches Q1-Q6 that are selectively controlled by gate drive signals provided by gate drive block 44 to generate AC current having a desired frequency and phase. In this embodiment, controller 22 monitors the current supplied to PM motor 16, although in other embodiments voltage may be monitored and regulated instead of current. In response to the provided AC current, PM motor 16 generates mechanical power that is supplied via gear transmission 20 to actuator 12. In the embodiment shown in FIG. 1, valve 21 is translated between an open position (i.e., 90 degrees) and a closed position (i.e., 0 degrees) and includes a return spring that provides a force that must be overcome in translating valve 21 to the open position and that provides a force that assists in translating valve 21 to the closed position.

Controller 22 controls the position of actuator 12 in response to external command signal pos_cmd. In particular, controller 22 acts to regulate the current supplied to PM motor 16 to control the opening/closing of actuator 12 to the commanded position. Controller 22 may be implemented by a microprocessor, a digital signal processor, and/or a plurality of discrete devices to implement the functionality illustrated with respect to FIG. 1. Controller 22 also includes a plurality of inputs for monitoring current (e.g., ia, ib, and ic) supplied to PM motor 16, and resolver signals related to the position and speed of actuator 12.

In particular, controller 22 is configured to improve the dynamic response of actuator 12 and improve operation of actuator 12 when holding the actuator 12 at a desired position. In the embodiment shown in FIG. 1, controller 22 employs feed forward block 32 in conjunction with inputs provided by reference model 28 to improve the dynamic response of actuator 12. In addition, when holding actuator 12 at a steady position, synchronous current regulator block 36 employs adaptive gains based on detected oscillations in the d- and q-axis feedback signals to minimize mechanical oscillations in actuator 12.

In the embodiment shown in FIG. 1, resolver processor block 24 monitors a sine and cosine signal provided by resolver 18. In response, resolver processing block 24 generates an electrical angular position value θ, a position feedback signal pos_fdbk, and a speed feedback signal spd_fdbk. In one embodiment described in more detail with respect to FIG. 3, resolver processing block 24 utilizes a phase lock loop and synchronous sampling algorithm to generate the desired feedback signals. In other embodiments, other well-known means of detecting position and speed of PM motor 16 may be utilized.

Controller 22 utilizes a field oriented control (FOC) algorithm that converts monitored currents ia, ib and ic from the abc reference frame to the dq reference frame. In the embodiment shown in FIG. 1, abc-to-dq transformation block 26 converts the monitored current ia, ib and ic to direct axis and quadrature axis components id_fdbk and iq_fdbk, respectively, based in part on the monitored electrical angular position θ provided by resolver processing block 24. The output signals id_fdbk and iq_fdbk provided by abc-to-dq transformation block 26 represents the current provided to PM motor 16. As described in more detail below, the feedback signals id_fdbk and iq_fdbk are compared to commanded signals (i.e., reference signals id_ref and iq_ref) as part of a feedback loop to control the operation of inverter 14.

Reference model 28 generates a position reference signal pos_ref and a speed reference signal spd_ref based on a position command signal pos_cmd received from an external source. Reference model 28 defines constraints regarding how quickly valve 21 may be opened or closed by setting velocity and acceleration limits that are reflected in the position reference signal pos_ref and speed reference signal spd_ref. Position speed control block 30 compares the position reference signal pos_ref and the speed reference signal spd_ref (which represent the desired position and speed of the motor) with a position feedback signal pos_fdbk and a speed feedback signal spd_fdbk, respectively, to generate a q-axis reference current command iq_ref. Position controller 30 calculates a position error signal (not shown) and provides the error to a proportional-integral (PI) controller. In addition, position controller 30 includes a speed controller with non-linear gain that is used to provide a near-optimal transient response to motor torque disturbances, specifically during spring assist mode. Field weakening block 34 generates a d-axis reference current command id_ref based on the monitored speed feedback signal spd_fdbk. In some embodiments, field weakening may not be required, and field weakening block 34 may be omitted.

Feed forward block 32 generates a q-axis feed forward current signal iq_feed and q-axis feed forward voltage signal vq_feed based on the position reference signal pos_ref and the speed reference signal spd_ref. The feed forward signals iq_feed and vq_feed compensate for the mechanical characteristics of the actuator, including the mechanical contribution/impairment provided by the spring (not shown), characteristics of the valve, and voltage constant of the permanent magnet motor. In this way, the feed forward signals iq_feed and vq_feed improve the dynamic performance of the motion control system 10.

The q-axis and d-axis reference signals iq_ref and id_ref, along with the q-axis and d-axis feed forward signals iq_feed and id_feed are provided to synchronous current regulator 36 for comparison with the q-axis and d-axis feedback signals iq_fdbk and id_fdbk. In response to provided inputs, synchronous current regulator 36 generates a q-axis voltage reference vq_ref and a d-axis voltage reference vd_ref. The dq-to-abc transformation block 38 converts the q-axis and d-axis voltage references vq_ref and vd_ref from the dq reference frame to the abc reference frame (e.g., va_ref, vb_ref, and vc_ref). Sine triangle PWM control shoot-through protection block 40 converts the abc reference voltages va_ref, vb_ref, and vc_ref to pulse width modulation (PWM) signals. Gate drive block 44 generates gate drive signals provided to each of the plurality of solid-state devices Q1-Q6 included within inverter 14 to convert the DC input to a desired AC output. In the embodiment shown in FIG. 1, overcurrent protection block 42 monitors the currents ia, ib, and is and in response generates an overcurrent signal that is provided to gate drive block 44.

Figure 2:
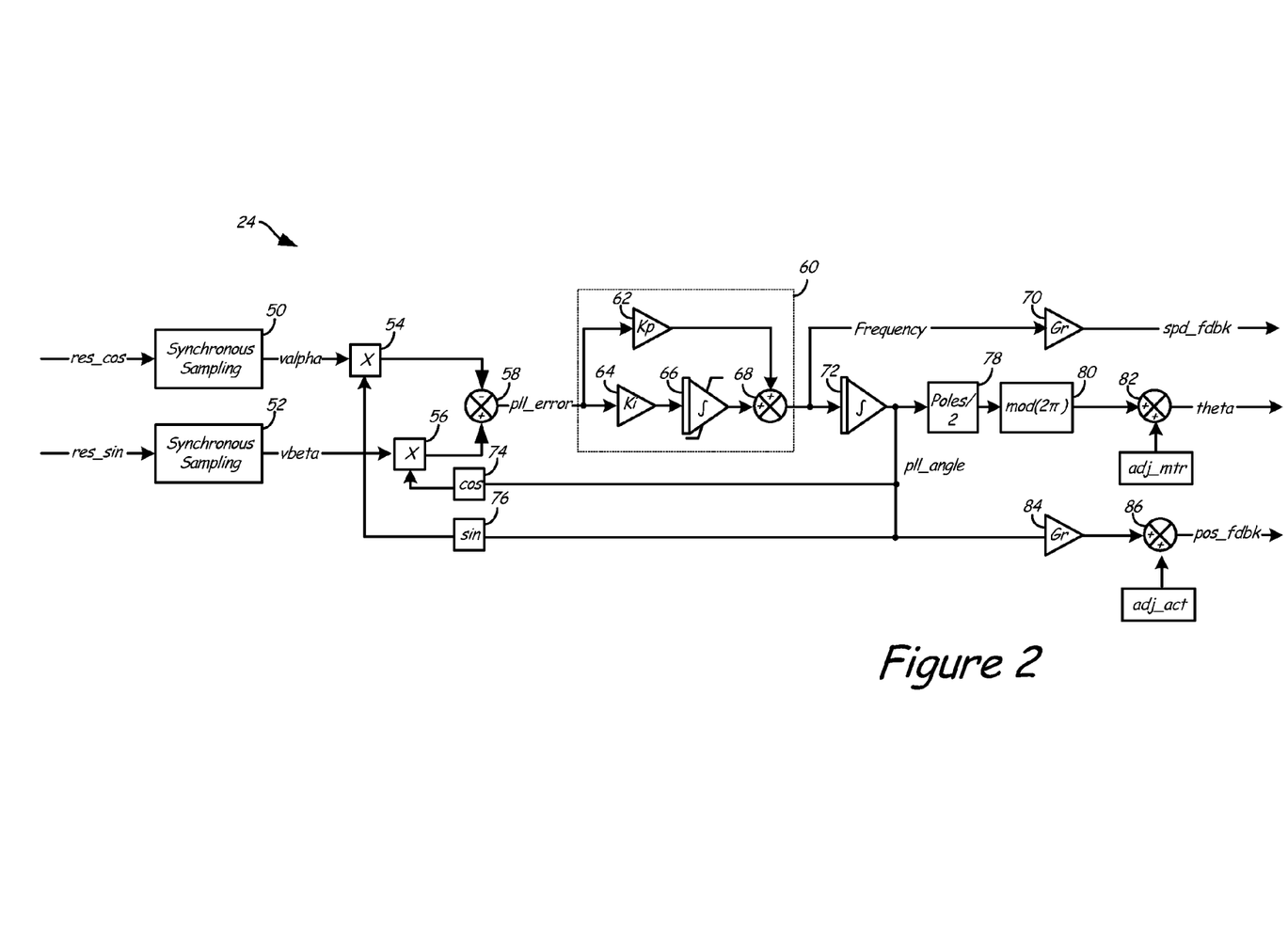
FIG. 2 is a block diagram of functions performed by the resolver processing block according to an embodiment of the present invention.

FIG. 2 is a block diagram of functions performed by the resolver processing block 24 according to an embodiment of the present invention. Resolver processing block 24 receives a cosine signal res_cos and sine signal res_sin from resolver 18 (shown in FIG. 1), and in response generates a position feedback signal pos_fdbk, a speed feedback signal spd_fdbk, and a electrical angular position θ. The functions illustrated in FIG. 2 implement a phase-lock loop algorithm, in which the phase θ provided by phase/frequency processor 16 is updated with each sample of the monitored input. Resolver processing block 24 may be implemented within controller 22, or may be implemented separate from controller 22, as part of resolver 18. In the latter embodiment, resolver 18 would process the sine and cosine signals internally, and provide controller 22 with an electrical angular position signal θ, a speed feedback signal spd_fdbk, and a position feedback signal pos_fdbk.

In the embodiment shown in FIG. 2, the monitored sine and cosine signals provided by resolver 18 (shown in FIG. 1) are sampled at the peaks of the excitation signal by the synchronous sampling blocks 50 and 52, respectively. These sampled values are interpreted as the αβ reference frame, represented as voltage signals valpha and vbeta. Multiplier block 54 multiplies the signal valpha by the sine of the phase-lock loop angle PLL_angle, which represents the most recent phase estimate. Likewise, multiplier block 56 multiplies the signal vbeta by the cosine of the phase-lock look angle PLL_angle. The outputs of multiplier blocks 54 and 56 are compared by difference block 58 to calculate a difference or error pll_error between the signals that represents the difference between the current phase estimate and the phase indicated by resolver 18. The functions performed in calculating the error between the current phase estimate and the phase of the resolver feedback in the embodiment shown in FIG. 2 can be represented mathematically by the following equation:

$$\sin(x-y) = \sin(x)*\cos(y) - \cos(x)*\sin(y) \quad \text{Equation 1}$$

where x=resolver phase estimate; and
y=current phase estimate.

Equation 1 is based on the assumption that the sampling rate is great enough that phase advancement between the current phase estimate and the phase of the monitored resolver signals is relatively small (i.e., x≈y).

The calculated error pll_error between the resolver feedback and the current phase estimate is provided to proportional-integral (PI) controller 60 to generate an output that is representative of the speed monitored by resolver 18. The operation of PI controller 60 is tuned via proportional function 62 and integral function 64. The error signal pll_error is provided to proportional function 62, and to integrator function 64 with integrator 66, with the output of proportional function 62 and integrator 66 being summed by summer block 68 to implement PI control. The output of summer block 68 represents a frequency associated with resolver 18 that is converted to a speed feedback signal by Gr function block 70. The output of integrator 66 is likewise provided to integrator 72, which integrates the frequency signal to generate a position estimate referred to as the phase-lock loop angle pll_angle.

In the embodiment shown in FIG. 2, the phase-lock loop angle pll_angle is provided in feedback via cosine block 74 and sine block 76 for comparison the with the sine and cosine inputs received from resolver 18. In addition, the phase-lock loop angle pll_angle is converted to an electrical angular position θ and a position feedback signal pos_fdbk. Multiplier block 66, function block 80 and summer block 82 convert the phase-lock loop angle pll_angle to an electrical angular position θ. Multiplier block 66 takes into account the number of poles associated with the permanent magnet motor being controlled, and function block 68 provides wrapping (if necessary) of the new position estimate if it extends beyond a desired range (i.e., wraps the estimate back around within a desired range, e.g., 0 to 2π). Summer block 70 combines the position estimate with adjustment motor value 72 to generate electrical angular position θ. Function block 84 and summer block 86 convert the phase-lock loop angle pll_angle to a position feedback signal, which is not related to the number of poles associated with PM motor 16, but rather relates to the position of actuator 12.

A benefit of resolver processing block 24 is the sampling rate defined by synchronous sampling blocks 50 and 52 can be much greater than the zero-crossing frequency of the sine and cosine waveforms typically used to monitor position and speed. In this way, the electrical angular position θ, speed feedback signal spd_fdbk and position feedback signal pos_fdbk are updated more frequently than in a system that relies on zero cross detection. As a result, the higher sampling rate decreases the error in the position estimate and thereby improves the performance of controller 22 in accurately controlling actuator 12.

Figure 3:
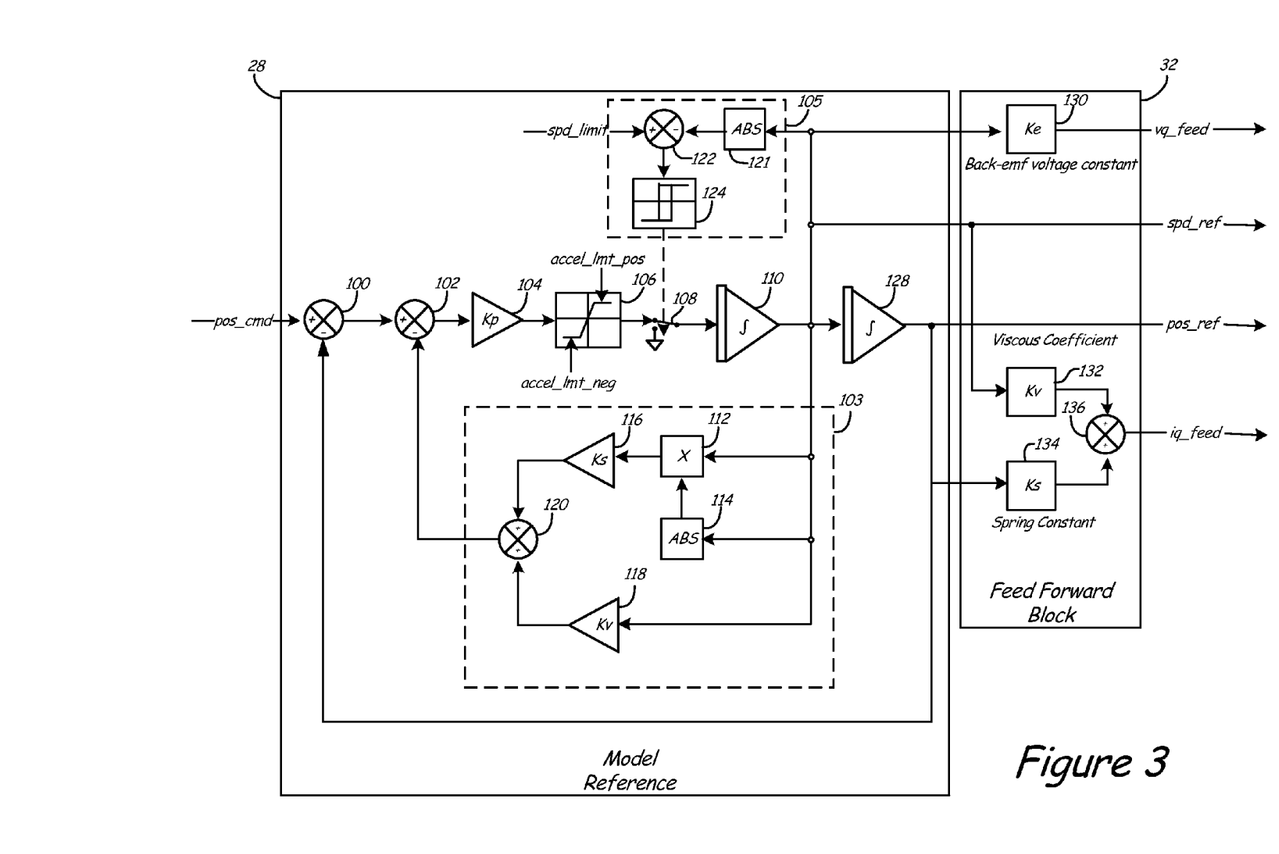
FIG. 3 is a block diagram of functions performed by the model reference and the feed forward block according to an embodiment of the present invention.

FIG. 3 is a block diagram of functions performed by model reference block 28 and feed forward block 32 according to an embodiment of the present invention. Model reference block 28 generates position and velocity references spd_ref and pos_ref from the input position command pos_cmd to obtain time-optimal trajectories. For example, to open the actuator valve the position command signal pos_cmd may suddenly change from a value of 0 degrees to a value of 90 degrees. However, the mechanical nature of actuator valve 21 dictates that it cannot be instantly opened or closed. Model reference 28 calculates the optimal position and speed reference signals to open/close the actuator valve. In this way, model reference 28 is employed to implement acceleration and velocity limits associated with the actuator valve opening/closing, and determines the dynamic response and damping associated with the actuator valve. Feed forward block supplements the position and speed reference values provided by model reference block 28 by generating feed forward signals to account for particular characteristics of actuator 12 such as the viscosity and spring assisted closing mechanism of actuator 12.

In the embodiment shown in FIG. 3, model reference block 28 receives the position command signal pos_cmd and compares it to the position reference signal pos_ref at comparator block 100. The resulting error or difference between the position command signal pos_cmd and the position reference signal pos_ref is compared with a damping value provided by damping block 103, which generates the damping value in response to the speed reference signal spd_ref provided as an output of model reference block 28. The error or difference provided by comparator 102 is provided to Kp function block 104, which defines the frequency response of the system. For example, in one embodiment function block 104 is defined to provide a frequency response of eight Hertz (e.g., Kp=ω², ω=54 rad/s). In other embodiments, the frequency response may be varied depending on the application. The frequency response defined by Kp function block 104 represents the rate at which the PM motor should be accelerated. Thus, the output of Kp function block 104 represents an acceleration command.

Acceleration limit block 106 applies an acceleration limit (positive or negative) to the acceleration command provided by Kp function block 104 associated with permanent magnet motor 16. Integrator 110 integrates the acceleration command provided by acceleration limit block 106 to define speed reference signal spd_ref which is provided as an output to position speed control block 30. In addition, speed reference signal spd_ref is provided to feed forward block 32 to generate the q-axis field forward signal vq_feed, and is provided in feedback to damping block 103 and speed limit block 105.

Damping block 103 includes multiplier block 112, absolute value block 114, Ks function block 116, Kv function block 118 and summer block 120. The absolute value of speed reference signal spd_ref is multiplied by the speed reference signal spd_ref to provide the square of the speed reference signal without losing the sign (negative or positive) of the speed reference signal spd_ref. The output of multiplier block 112 is multiplied by Ks function block 116. In one embodiment, the Ks function is defined as $$\frac{1}{2*\text{accel\_limit}},$$

wherein the term accel_limit is defined by acceleration limit block 106. The speed reference signal spd_ref is also multiplied by Kv function block 118. In one embodiment, the Kv function is defined as $$\frac{2\xi}{\sqrt{Kp}},$$

wherein $\zeta$ is set equal to a constant value (e.g., 0.7) and Kp function is equal to $\omega^2$. Summer block 120 sums the outputs of Ks function block 116 and Kv function block 118 to generate the damping value provided to difference block 102.

Similarly, speed limit block 105 monitors the speed reference signal spd_ref, and via absolute function block 121 provides the absolute value of the speed reference signal spd_ref to difference block 122 for comparison with speed limit value spd_limit. If the speed reference signal spd_ref is significantly greater than the speed limit value spd_limit, then switch 108 disconnects integrator 110 from the output of acceleration limit block 106, and connects integrator 110 to a value of zero (i.e., ground). In this way, the speed reference signal spd_ref provided by integrator 110 is prevented from increasing beyond a determined speed limit value. Hysteresis block 124 prevents toggling of switch 108 when the speed reference signal is near the determined speed limit value. In addition, the speed reference signal spd_ref is provided to integrator 128, which integrates the speed reference signal to generate a position reference signal pos_ref. The position reference signal pos_ref and the speed reference signal spd_ref represent a command vector that is provided to feed forward block 32 and position speed control block 30.

Feed forward block 32 generates in response to the output vector (speed reference spd_ref and position reference pos_ref) provided by model reference 28 feed forward signals (iq_feed and vq_feed) to account for mechanical aspects of the bias spring and metering valve associated with actuator 12. In the embodiment shown in FIG. 3, feed forward block 32 is based on the speed reference signal spd_ref and position reference signal pos_ref. In particular, Ke function block 130 generates in response to the speed reference signal spd_ref a q-axis voltage feed forward signal vq_feed.

Feed forward block also genereates a q-axis feed forward current signal iq_feed based on the speed reference signal spd_ref and position reference signal pos_ref. In particular, the speed reference signal spd_ref is provided to Kv function block 132, which accounts for the viscous coefficient of the actuator. The position reference signal pos_ref is provided to Ks function block 134, which accounts for the spring constant of the actuator. The output of Kv function block 132 and Ks function block 134 is summed by summer block 136, which provides the q-axis current feed forward signal iq_feed.

A benefit of feed forward block 32 is the feed forward signals are based on the reference signals (e.g., spd_ref and pos_ref) provided by model reference block 28, rather than the feedback signals, and therefore are better suited to predict the dynamic response associated with actuator 12.

Figure 4:
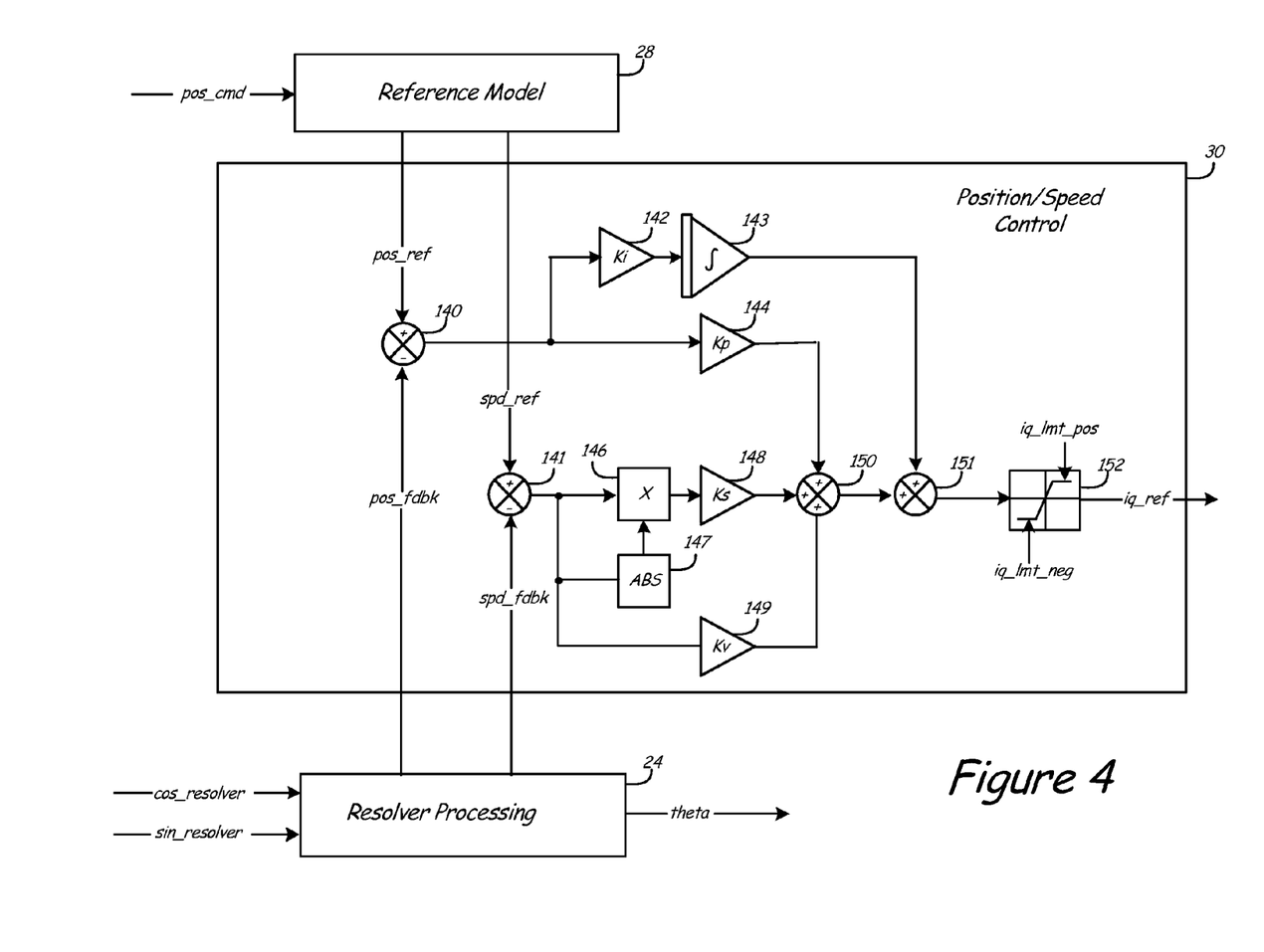
FIG. 4 is a block diagram of functions performed by position/speed control block according to an embodiment of the present invention.

FIG. 4 is a block diagram of functions performed by position/speed control block 30 according to an embodiment of the present invention. As discussed with respect to FIGS. 2 and 3, reference model block 28 generates in response to a position command signal pos_cmd a position reference signal pos_ref and a speed reference signal spd_ref that represent the desired position and speed of actuator 12. Resolver processing block 24 generates in response to cosine and sine waveforms provided by resolver 18 a position feedback signal pos_fdbk and a speed feedback signal spd_fdbk that represent the actual position and speed of actuator 12. Position speed control block 30 compares the desired speed and position signals with the monitored speed and position signals to generate commands used to control the operation of inverter 14 (i.e., to ultimately reduce the error or difference between the desired position and speed values and the monitored position and speed values).

In general, position speed controller 30 comprises an inner feedback loop that seeks to minimize the difference between the speed reference signal spd_ref and the speed feedback signal spd_fdbk, and an outer feedback loop that seeks to minimize the difference between the position reference signal pos_ref and the position feedback signal pos_fdbk, while taking into account the output of the speed feedback loop.

Difference block 141 compares the speed reference signal spd_ref with the speed feedback signal spd_fdbk to generate a speed error signal. Multiplier block 146 multiplies the speed error signal by the absolute value of the speed error signal provided by absolute value block 147 to generate a squared value of the speed error signal that retains the sign of the error signal (positive or negative). The output of multiplier block 146 is applied to Ks function block 148. In one embodiment, the Ks function is defined as $$\frac{1}{2*\text{accel\_limit}},$$

wherein the term accel_lmt is defined by acceleration limit block 106 described with respect to FIG. 3. The speed error signal is also multiplied by Kv function block 149. In one embodiment, the Kv function is defined as $$\frac{2\xi}{\sqrt{Kp}},$$

wherein $\zeta$ is set equal to a constant value (e.g., 0.7) and Kp function is equal to $\omega^2$. Summer block 150 sums the outputs of Ks function block 148 and Kv function block 149. In addition, summer block 150 sums the output of Kp function block 144, which indicates the frequency response associated with the error signal generated by difference block 140. The output of summer block 150 represents the inner speed feedback loop.

Likewise, difference block 140 compares the position reference signal pos_ref with the position feedback signal pos_fdbk to generate a position error signal. The output of difference block 140 is provided to Ki function block 142, Kp function block 144, and integrator 143 to provide proportional integral control with respect to the position feedback. As discussed above, in one embodiment the Kp function block 144 implements the function $Kp=\omega^2$, where $\omega=54$ rad/ s, and the output is summed by summer block 150. The output of summer block 150 is summed with the output of integrator block 143 to generate a q-axis reference signal that represents the command signal required to minimize the error between the respective reference signals and feedback signals. The q-axis reference signal is applied to limiter block 152 to limit the q-axis current reference signal iq_ref within an acceptable range.

Figure 5:
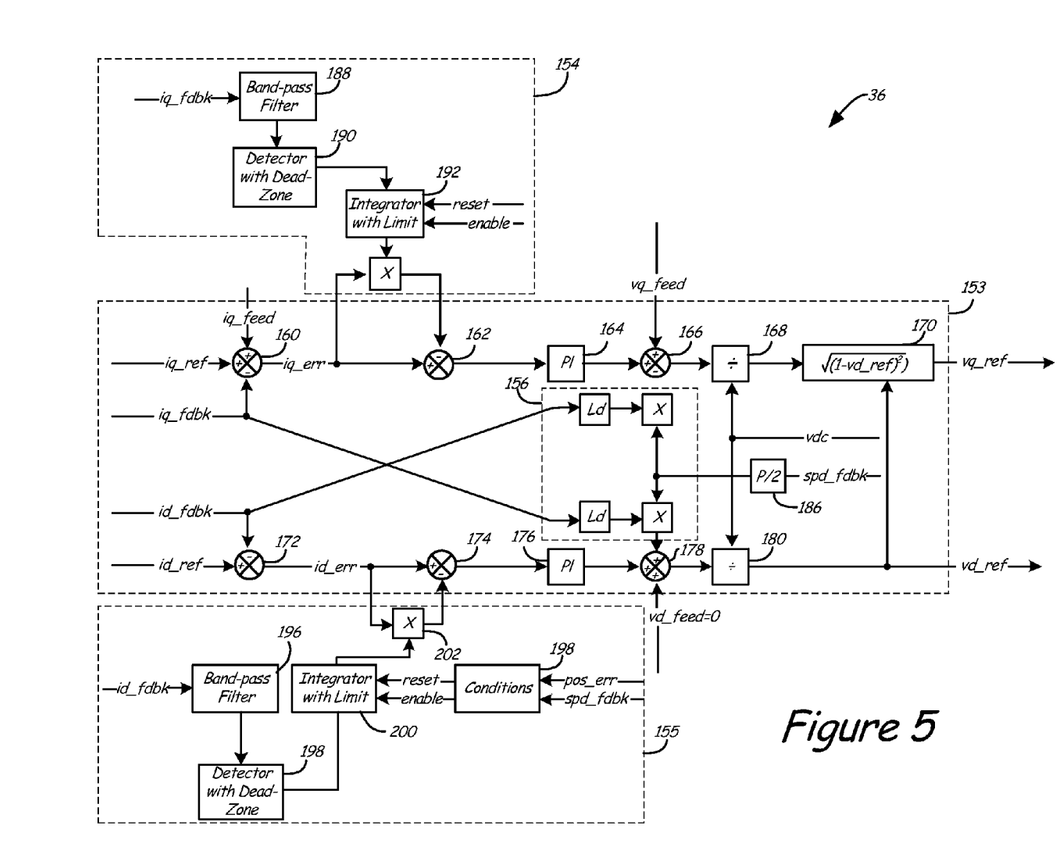
FIG. 5 is a block diagram of a synchronous current regulator with adaptive gains according to an embodiment of the present invention.

FIG. 5 is a block diagram of synchronous current regulator 36 with adaptive gains according to an embodiment of the present invention. Synchronous current regulator 36 includes dq regulation block 153, q-axis adaptive gain block 154, and d-axis adaptive gain block 155. In the embodiment shown in FIG. 3, dq regulation block 153 compares the dq reference signals iq_ref and id_ref to feedback signals id_fdbk and iq_fdbk, respectively, and generates in response dq reference signals vq_ref and vd_ref for provision to dq-to-abc transformation block 38 (shown in FIG. 1). The reference signals vq_ref and vd_ref act to minimize differences between the reference signals and the feedback signals.

In particular, the q-axis reference signal iq_ref is compared with the q-axis feedback signal iq_fdbk at difference block 160 to generate an error signal iq_err. In the embodiment shown in FIG. 4, the q-axis feed forward signal iq_feed is added to the error signal iq_err by difference block 160. The q-axis error signal iq_err is compared with a q-axis adaptive gain output at difference block 162. The output of difference block 162 is provided to PI controller 164. The output of PI controller 164 is decoupled from the d-axis component by subtracting a decoupling output provided by decoupling block 156 from the output of PI controller 164. In addition, the q-axis feed forward signal vq_feed is added to the output of PI controller 164 by summer block 166. The output of summer block 166 is normalized by dividing the output signals by dc bus voltage vdc at divider block 168. Function block 170 applies a function related to the d-axis reference signal vd_ref in order to maintain the q-axis reference voltage vq_ref within stator voltage limitations. In the embodiment shown in FIG. 4, the function is defined as $\sqrt{(1-(vd\_ref)^2}$.

A similar algorithm is applied to the d-axis component. The d-axis reference signal id_ref is compared with the d-axis feedback signal id_fdbk by difference block 172 to generate a d-axis error signal id_err. The d-axis error signal id_err is compared with the d-axis adaptive gain output at difference block 174. The output of difference block 174 is provided to PI controller 176 to generate an output that acts to drive the input provided to PI controller block 176 to zero. The output of PI controller 176 is decoupled from the q-axis component at summer block 178. In addition, a summer block 178 adds a d-axis feed forward signal vd_feed to the output of PI controller block 176. In the embodiment shown in FIG. 4, the d-axis feed forward signal vd_feed is set equal to zero. The output of summer block 178 is divided by the DC bus voltage vdc by divider block 180 to generate the d-axis reference signal vd_ref.

Adaptive gain blocks 154 and 155 acts to minimize current loop instability created when the actuator is commanded to be held in a particular position that overlaps motor detent positions. In particular, adaptive gain blocks 154 and 155 monitor the feedback signals iq_fdbk and id_fdbk, respectively, for oscillations, and in response to detected oscillations generate an adaptive gain signal that is added to the respective error signals iq_err and id_err.

In particular, in the embodiment shown in FIG. 5, the q-axis feedback signal iq_fdbk is provided to band-pass filter 188 and the output is provided to dead-zone detector 190 to select a particular frequency current ripple within the feedback signal. Integrator 192 generates the adaptive gain signal by integrating the detected current ripple, but is selectively activated to provide an adaptive gain signal only when the actuator is in a holding position. When the actuator is not in a holding position, then integrator 192 is selectively reset and therefore does not provide an output to be added to the error signal iq_err. When enabled, the output of integrator block 192 is multiplied with the error signal iq_err by multiplier block 194, with the multiplied output being subtracted from the q-axis error signal iq_err by difference block 162.

Likewise, the d-axis feedback signal id_fdbk is provided to band-pass filter 196 and the output is provided to dead-zone detector 198 to select a particular frequency current ripple within the feedback signal. Integrator 200 generates an adaptive gain signal by integrating the detected current ripple, but is once again selectively activated to provide an adaptive gain signal only when the actuator is in a holding position. In the embodiment shown in FIG. 4, conditions block 198 monitors the position error signal pos_err and speed feedback signal spd_fdbk to determine whether integrator 200 should be enabled or rest. When enabled, the non-zero output provided by integrator 200 is multiplied with the d-axis error signal id_err, with the multiplied output being subtracted from the d-axis error signal id_err.

Figure 6:
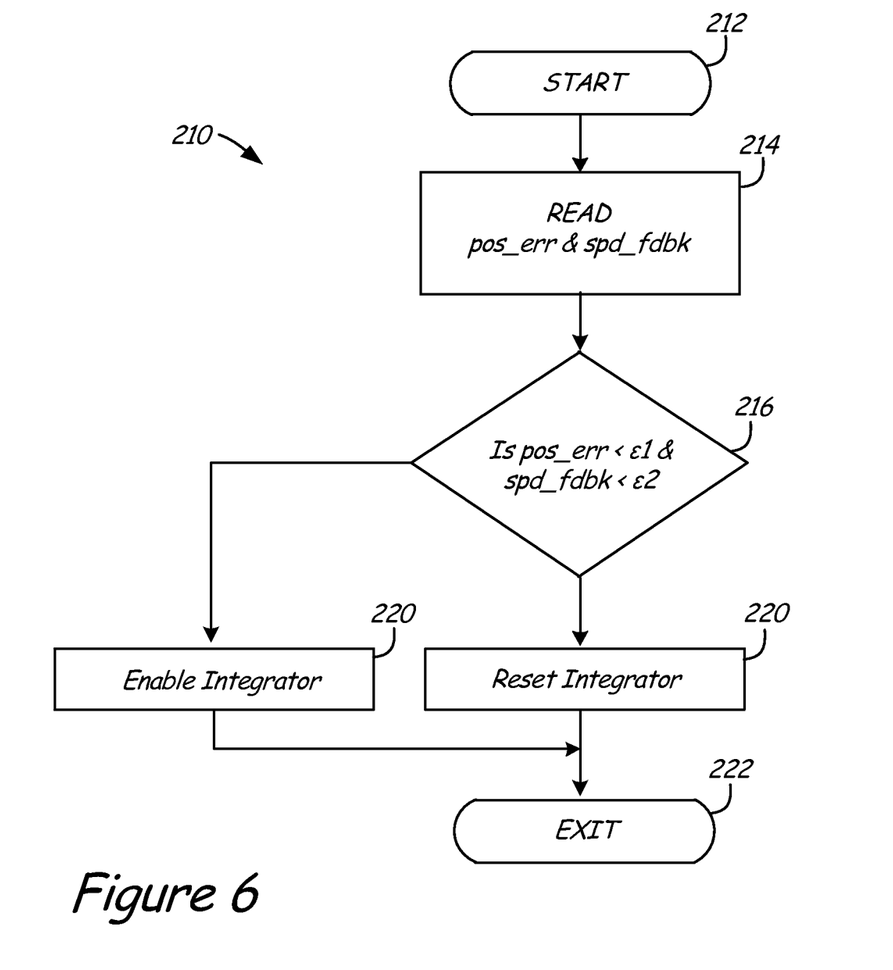
FIG. 6 is a flowchart that illustrates generation of integrator control signals according to an embodiment of the present invention.

FIG. 6 is a flowchart that illustrates steps implemented by conditions blocks 193 and 198 in determining whether to enable or reset integrator blocks 192 and 200. Condition blocks 193 and 198 implement the same procedure, and in one embodiment are implemented by a single functional block, with the resulting enable and reset signals provided to both integrator 192 and integrator 200. For purposes of this discussion, operations are discussed with respect to condition block 193, although the same operations would be performed with respect to condition block 200.

The method begins at step 212. At step 214, position error signal pos_err and speed feedback signal spd_fdbk are received as inputs by the respective conditions blocks 193 and 198. At step 216, the position error signal pos_err is compared to a first threshold value $\epsilon_1$ and the speed feedback signal spd_fdbk is compared to a second threshold value $\epsilon_1$. If both the position error signal pos_err and the speed feedback signal spd_fdbk are less than the threshold values, this is indicative that the actuator is being held at a particular position (i.e., is no longer moving from a first position to a second position), and integrator 192 is enable at step 218. If either the position error signal pos_err or the speed feedback signal spd_fdbk is not less than the respective threshold values then integrator 192 is reset at step 220. At step 222, the method ends.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A controller for an electric actuator, the controller comprising:
   a plurality of inputs for receiving signals representing monitoring currents supplied to the electric actuator, for receiving a position feedback signal that represents a monitored position of the electric actuator, and for receiving a speed feedback signal that represents a monitored speed of the electric actuator;
an abc-to-dq transformation block that converts the monitored current from an abc reference frame to a dq reference frame to generate each of a q-axis and d-axis current feedback signals;
a reference model for receiving a position command signal that dictates a desired position of the electric actuator and generates a position reference signal and a speed reference signal in response to the receiving of the position command signal;
a position speed control block that compares the position reference signal to the position feedback signal and compares the speed reference signal to the speed feedback signal to generate a q-axis current reference signal;
a feed forward block that generates a q-axis current feed forward signal based on the speed reference signal and the position reference signal, wherein the feed forward block includes a viscosity function applied to the speed reference signal to account for mechanical viscosity of the electric actuator and a spring function applied to the position reference to account for mechanical spring force of the electric actuator, and wherein the output of the viscosity function is summed with the output of the spring function to generate the q-axis current feed forward signal;
a synchronous current regulator that compares the q-axis current feedback signal to the q-axis reference signal to generate a q-axis current error signal, wherein the q-axis current error signal is modified by the q-axis current feed forward signal, and in response to the q-axis error signal generates a q-axis voltage reference signal and a d-axis voltage reference signal;
a dq-to-abc transformation block that converts the q-axis voltage reference signal and the d-axis voltage reference signal from the dq reference frame to voltage reference signals in the abc reference frame; and
a pulse width modulation (PWM) control block that generates PWM signals based on the voltage reference signals provided by the dq-to-abc transformation block for provision to an inverter that supplies current to the electric actuator.

2. The controller of claim 1, wherein the feed forward block includes a back electromagnetic force (BEMF) function that is applied to the speed reference signal to account for the effect a BEMF force generated by the electric actuator, wherein the output of the BEMF function is a q-axis voltage feed forward signal.

3. The controller of claim 1, wherein the synchronous current regulator includes a q-axis adaptive gain block that monitors the position error signal and the speed feedback signal to determine when the electrical actuator being held in position, and in response to the electrical actuator being held in position enables an integrator that integrates oscillations detected in the monitored q-axis feedback signal, wherein the output of the integrator is combined with the q-axis current error signal.

4. The controller of claim 1, wherein the synchronous current regulator compares d-axis current feedback signal to a d-axis reference signal provided by the position speed control block to generate a d-axis current error signal, and includes a (PI) controller that generates in response to the d-axis current error signal a d-axis voltage reference signal.

5. The controller of claim 2, wherein the synchronous current regulator includes a proportional-integral (PI) controller that generates an output in response to the q-axis current error signal that is combined with the q-axis voltage feed forward signal provided by the feed forward block in generating the q-axis voltage reference signal.

6. The controller of claim 4, wherein the synchronous current regulator includes a d-axis adaptive gain block that monitors the position error signal and the speed feedback signal to determine when the electrical actuator being held in position, and in response to the electrical actuator being held in position enables an integrator that integrates oscillations detected in the monitored d-axis feedback signal, wherein the output of the integrator is combined with the d-axis current error signal.

7. A method of regulating position and speed of an electric actuator, the method comprising:
monitoring currents supplied to the electric actuator;
monitoring position and speed of the electric actuator;
converting the monitored currents from an abc reference frame to a dq reference frame to generate q-axis and d-axis current feedback signals;
generating a position reference signal and a speed reference signal based on a position command received from an external source;
comparing the position reference signal to the position feedback signal and comparing the speed reference signal to the speed feedback signal to generate a q-axis current reference signal;
applying a viscosity function to the speed reference signal to account for mechanical viscosity of the electric actuator;
applying a spring function to the position reference signal to account for mechanical spring force of the electric actuator;
combining the output of the viscosity function with the output of the spring function to generate a q-axis current feed forward signal;
comparing the q-axis current feedback signal to the q-axis reference signal to generate a q-axis current error signal, and adding the q-axis current feed forward signal to the q-axis current error signal;
comparing the d-axis current feedback signal to the d-axis current reference signal to generation a d-axis current error signal;
generating a q-axis voltage reference signal based on the q-axis current error signal that will minimize the q-axis current error signal and generating a d-axis voltage reference signal based on the d-axis current error signal that minimize the d-axis current error signal;
converting the q-axis voltage reference signal and the d-axis voltage reference signal from the dq reference frame to voltage reference signals in the abc reference frame; and
generating pulse-width modulated (PWM) signals based on the voltage reference signals provided by the dq-to-abc transformation block for provision to an inverter that supplies current to the electric actuator.

8. The method of claim 7, further including:
generating a q-axis voltage feed forward signal by applying a back electromagnetic force (BEMF) function to the speed reference signal to account for the effect a BEMF force generated by the electric actuator.

9. The method of claim 7, further including:
detecting that the electric actuator has reached a holding position;
detecting oscillations in the monitored q-axis feedback signal;

generating an q-axis adaptive gain signal based on the detected oscillations in the monitored q-axis feedbacks signal in response to the electric actuator reaching the holding position; and applying the q-axis adaptive gain signal to the q-axis error signal.

10. The method of claim 9, further including:

detecting oscillations in the monitored d-axis feedback signal;

generating a d-axis adaptive gain signal based on the detected oscillations in the monitored q-axis feedback signal in response to the electric actuator reaching the holding position; and applying the d-axis adaptive gain signal to the d-axis error signal.

11. A current regulator for controlling an electric motor, the current regulator comprising:

inputs for receiving q-axis and d-axis reference current signals and q-axis and d-axis feedback current signals;

a q-axis current regulator loop that compares the q-axis reference current signal to the q-axis feedback current signal to generate a q-axis error signal, and includes a proportional-integral controller that generates a q-axis voltage command signal in response to the q-axis error signal;

a d-axis current regulator loop that compares the d-axis reference current signal to the d-axis feedback current signal to generate a d-axis error signal, and includes a proportional-integral controller that generates a d-axis voltage command signal in response to the q-axis error signal;

a conditions monitoring block that generates an enable signal when the electric motor is maintained in a particular position and generates a reset signal when the electric motor is not being maintained in a particular position;

a q-axis adaptive gain block that is activated in response to the enable signal to generate a q-axis adaptive gain value based on detected oscillations within the q-axis feedback signal that is combined with the q-axis error signal that is provided to the PI controller to generate the q-axis voltage command signal; and a d-axis adaptive gain block that is activated in response to the enable signal to generate a d-axis adaptive gain value based on detected oscillations within the d-axis feedback signal that is combined with the d-axis error signal that is provided to the PI controller to generate the d-axis voltage command signal.

12. The current regulator of claim 11, wherein the conditions monitoring block monitors a position error signal that represents a difference between a desired position of the electric motor and a monitored position of the electric motor and a speed feedback signal that represents a monitored speed of the electric motor to determine whether the electric motor is being maintained in a desired position.

13. The current regulator of claim 11, wherein the q-axis adaptive gain block detects oscillations within the q-axis current feedback signal within a particular frequency range and when enabled integrates the detected oscillations, and multiplies the integrated output with the q-axis error signal to generate the q-axis adaptive gain value.

14. The current regulator of claim 11, wherein the d-axis adaptive gain block detects oscillations within the d-axis current feedback signal within a particular frequency range and when enabled integrates the detected oscillations, and multiplies the integrated output with the d-axis error signal to generate the d-axis adaptive gain value.

15. The current regulator of claim 12, wherein the conditions monitoring block compares the position error signal to a first threshold value and the speed feedback signal to a second threshold value and if both the position error signal and the speed feedback are less than the respective threshold values, then the conditions monitoring block generates the enable signal.

* * * * *